July 20, 1954  H. J. WOOD  2,684,196
TURBINE DRIVEN FAN UNIT
Filed Sept. 17, 1949  2 Sheets-Sheet 2
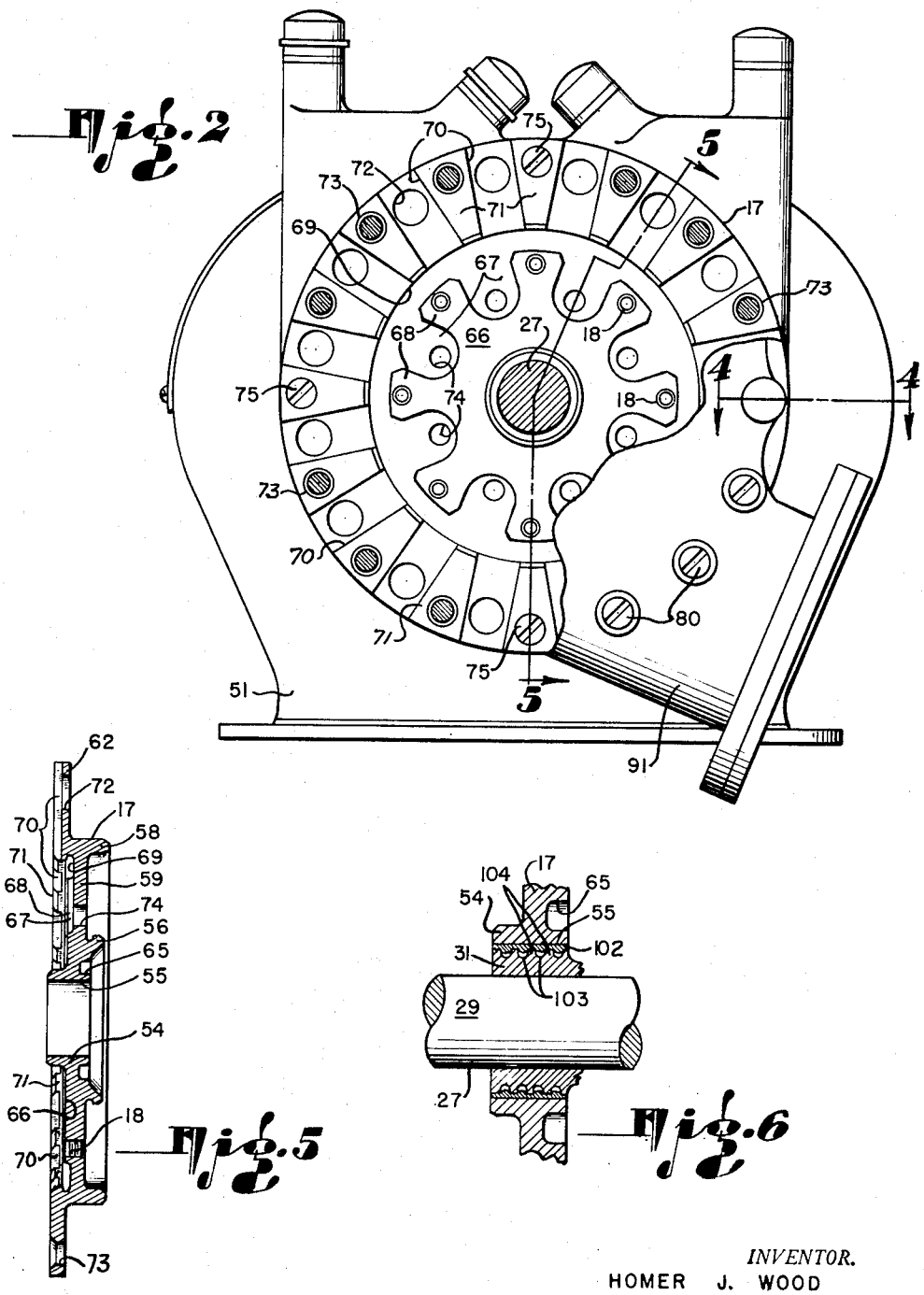
INVENTOR.
HOMER J. WOOD
BY
ATTORNEY Patented July 20, 1954

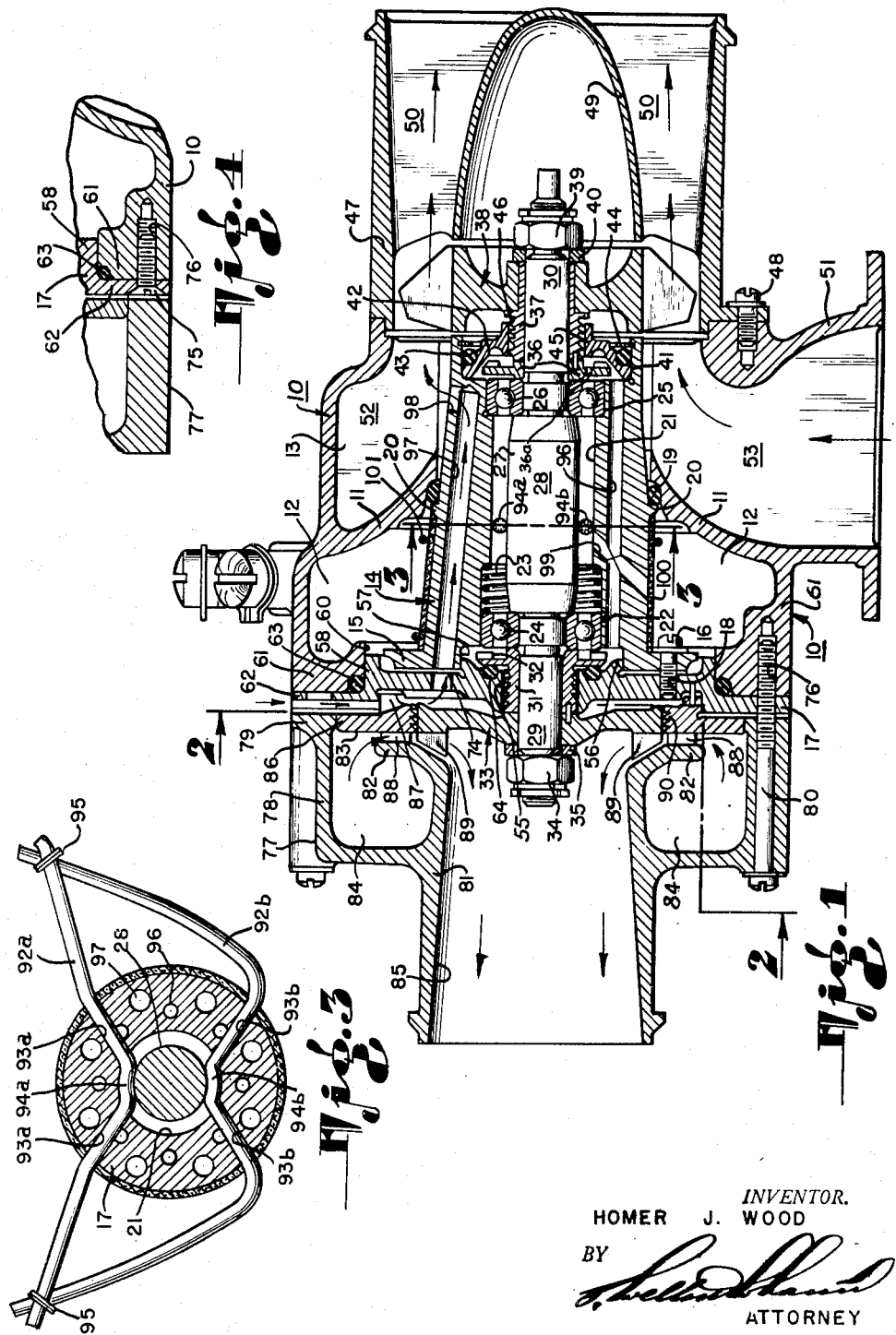

2,684,196

UNITED STATES PATENT OFFICE 2,684,196

TURBINE DRIVEN FAN UNIT

Homer J. Wood, Sherman Oaks, Calif., assignor to The Garrett Corporation, Los Angeles, Calif., a corporation of California Application September 17, 1949, Serial No. 116,370

8 Claims. (Cl. 230—116)

The present invention relates generally to fluid circulating devices, and is more particularly concerned with a compact high velocity turbine driven unit of the type utilized for air conditioning and refrigeration.

According to the general concepts of the present invention, the invention relates to a high velocity expansion turbine having extremely high volumetric capacity for a given size and weight of device, thereby making the unit especially suitable for use in aircraft. The present application constitutes a continuation-in-part of my copending applications, Serial No. 686,275, filed July 26, 1946, covering Turbine Driven Circulating Unit, now Patent No. 2,492,672, and Serial No. 67,506, filed December 27, 1948, covering a Turbine Driven Unit.

The present invention has for one of its objects the provision of a turbine driven fan unit having novel means for lubricating and cooling its bearings, which is of simple construction and of such design that it will operate efficiently at extremely high velocities of operation of the unit.

Another object of the invention is to provide an improved casing construction in a unit of the character described in which ambient air is admitted circumferentially around the turbine end of the casing and is carried into heat transfer relation with the turbine wheel, and then circulated as a cooling medium for the bearings of the unit.

Still another object is to provide in a unit of the herein described type, improved sealing means for the turbine end of the unit.

Further objects and advantages of the invention will be brought out in the following part of the specification wherein a detailed disclosure of the invention is made for the purpose of disclosing one embodiment thereof without limiting the scope of the invention.

Referring to the drawings which are for illustrative purposes only:

Fig. 1 is a longitudinal sectional view of a turbine driven fan unit embodying the features of the invention;

Fig. 2 is an end elevational view of the turbine end of the unit, portions being cut away and a transverse section taken therethrough substantially on line 2—2 of Fig. 1;

Fig. 3 is a transverse sectional view through the bearing structure, taken substantially on line 3—3 of Fig. 1;

Fig. 4 is a fragmentary sectional view, taken substantially on line 4—4 of Fig. 2;

Fig. 5 is a detailed sectional view through the turbine end sealing member, taken substantially on line 5—5 of Fig. 2 and Fig. 6 is an enlarged fragmentary sectional view showing details of the labyrinth seal around the turbine end of the shaft.

Referring now to the drawings, for illustrative purposes there is shown in Fig. 1 a fan unit constructed according to the present invention. The unit embodies a main housing 10 of hollow construction separated longitudinally by an internal septum 11 into an annular oil chamber 12 and an annular air inlet chamber 13 surrounding a bearing structure for supporting a rotor structure of the unit.

The bearing structure provides a tubular bearing support 14 having an end flange 15 by which it is secured as by a plurality of screws 16 to a seal member 17, the screws 16 being threaded into threaded openings 18 of the seal member. The bearing support 14 and seal member 17 are thus secured together to form an assembly which may be mounted and removed as a unit from the main housing. The bearing support 14 is resiliently supported and sealed with respect to the septum 11 by a sealing ring 19 which is interposed between a circumferentially extending shoulder 20 on the exterior surface of the bearing support 14, and the adjacent inner peripheral margin of the septum 11.

The tubular bearing support 14 is of generally tapered construction from the end flange 15 to its opposite end and is provided with a longitudinally extending axial bore 21. Adjacent the flange 15, the bore 21 is provided with a counterbore 22 which receives a bearing loading spring 23 and the outer race of a ball bearing 24. The other end of the bearing support 14 contains a counterbore 25 to receive the outer race of ball bearing 26.

The ball bearings 24 and 26 support a shaft 27 of the rotor structure having a central body portion 28 and contracted end extensions 29 and 30. The extension 29 carries the ball bearing 24 at its inner end, the inner race of the ball bearing being secured between the end of the central body portion and the hub 31 of a slinger or fan element 32. A turbine wheel 33 is secured on the end extension 29 in abutment with the outer end of hub 31 by means of a securing nut 34, a washer 35 being interposed between the securing nut and the adjacent turbine wheel. At the opposite end, the inner race of ball bearing 26 is similarly supported between a slinger or fan element 36 and the adjacent end of the center body portion, the element 36 being provided with flow passages 36a.

The extension 30 has mounted thereon also a sleeve member 37 which carries a main air circulating fan 38, this assembly being secured by a nut 39, a washer 40 being interposed between the fan and nut.

The extreme end of the bearing support 14 at the fan end is provided with a counterbore 41 within which there is seated a seal ring 42, the seal ring being sealed at its periphery with a gasket 43 and retained in operative position by a snap ring 44. The seal ring 42 is centrally formed with a tubular sleeve 45 which is associated with the adjacent portion of sleeve member 37 in such a manner as to provide a labyrinth seal 46 between the slinger 36 and fan 38.

A cylindrical wall 47 is secured at its inner end to the adjacent end of the housing 10 by means of a plurality of screws 48 to house the fan 38 and also form an outlet passage for the air from the fan. The air outlet also includes a hollow dome 49 which is supported on the axis of the cylindrical wall 47 by means of a plurality of vanes 50 which separate the outlet into a plurality of outlet passages. The air inlet chamber 13 communicates at its bottom with an inlet conduit connection 51, which is similarly divided into two inlet passageways by vertically disposed vanes 52 and 53, so that the inlet air as it enters is divided and passes through separate passages in the air inlet chamber.

With further reference to the turbine end of the unit, details of construction of the seal member 17 will now be described, reference being had to the disclosure in Figs. 2 and 5. The seal member 17 is of general disc-like construction containing a tubular hub 54 defining a tubular bore 55. Adjacent this hub, but spaced outwardly slightly therefrom is an annular flange 56 which projects from the inner face of the seal member adapted to fit within a counterbore 57 of the adjacent end of the bearing support 14 so as to axially align these parts in assembled relation. Outwardly spaced from the flange 56 is a second flange 58, the flanges 56 and 58 being interconnected by a web 59. As shown in Fig. 1, the flange 58 is adapted to fit within an opening 60 defined by the inner periphery of an end flange 61 of the housing 10. The outer end of the flange 58 is deformed to provide a right angled flange 62 which is adapted to make face engagement with the end face of flange 61 of the housing. The seal member 17 is sealed adjacent its outer periphery with respect to the housing 10 by means of a gasket 63, and adjacent its inner periphery by means of a gasket 64 which is seated in an annular groove 65 and is adapted to bear against the adjacent slinger 32.

On its outer face, the seal member 17 is provided with a surface 66 which is in recessed relation to the outer surface of flange 62, the surface 66 being continuous adjacent the hub 54, but at its periphery is cut out to form plenum spaces 67 separated by spaced radially extending projections 68, the plenum spaces being interconnected by a circumferentially extending channel 69.

The outer face of the flange 62 is formed to provide radially extending channels 70 each separated by a rib 71. The channels have lightening openings 72 therein and the ribs have openings 73 therein countersunk at one end.

With the arrangement of channels just described and plenum spaces, it will be observed that each plenum space 67 has two channels 70 in communication therewith, and at the innermost end of each plenum space 67, there is provided a port opening 74.

As shown in Figs. 2 and 4, the seal member 17 is secured to the end flange 61 of the housing 10 by means of screws 75 which are inserted through the openings 73, which are in 90° relationship, and threadedly engage threaded sockets 76 in the end flange 61.

At the turbine end of the unit, there is provided a unitary casing 77 having an outer shell 78 which terminates in an end flange 79 adapted to abut the outer surfaces of the ribs 71 when secured in clamped relation thereagainst by means of a plurality of securing screws 80 positioned in the remaining openings 73 and threadedly engaging with threaded sockets 76 in the flange 61.

The shell 78 is formed with an axially arranged tubular wall 81 which defines an outlet passage for the turbine operating fluid. At its innermost end, the wall 81 is outwardly deflected to form a radial wall portion 82 axially spaced outwardly from the adjacent face of the seal member 17 to leave a space in which a nozzle member 83 is mounted, this nozzle space serving to connect a fluid inlet chamber 84 with the fluid outlet passage 85 defined by the tubular wall 81.

The nozzle member 83 comprises a ring body 86 the periphery of which is adapted to snugly fit within the flange 79, and is provided on its inner surface with circumferentially spaced projections 87 to extend into the channel 69 and thus align the nozzle member with respect to the seal member 17. The outer face of the ring body 86 is provided with a plurality of spaced apart projecting vanes 88 having outer edges adapted to abut the adjacent surface of the radial wall portion 82 and thus form fluid nozzles leading from the inlet chamber 84 to conduct the turbine operating fluid against turbine blades 89 carried by the turbine wheel 33. The periphery of the turbine wheel 33 is sealed with respect to the inner periphery of the ring body 86 by means of a labyrinth seal 90. With the foregoing arrangement as described, it will be noted that the end flange 79 and ring body 86 cooperate to close the open side of the channels 70 so that a plurality of flow passages circumferentially spaced around the exterior of the housing 10 operate to connect the port openings 74 with ambient air exteriorly of the unit. The inlet chamber 84 communicates with an inlet conduit connection 91, as shown in Fig. 2.

For lubricating the bearings 24 and 26, provision is made for conducting oil lubricant from the oil chamber 12 to the central body portion 28 of the shaft by means of wicks 92a and 92b, as shown in Fig. 3. These wicks are respectively threaded through passages 93a—93a and 93b—93b, so that intermediate portions 94a and 94b will engage the surface of the body portion 28. The ends of the wicks projecting on opposite sides of the bearing support 14 are brought together and secured by tie means 95.

Extending from end to end of the tubular bearing support 14, there are provided a plurality of longitudinally extending passages 96 circumferentially spaced at equal intervals around the bore 21 in the bearing support wall. Relatively larger cooling passages 97 are arranged in alternate relation with the passages 96, but having their axes disposed upon a slightly larger circumference than the passages 96. The passages 97 at one end open into the end flange 15 of the bearing support 14, and each passage 97 thus registers at this end with one of the port openings 74 of the seal member 17. The opposite end of the passage 97 communicates with a port opening 98 which forms a fan inlet connection between this end of each of the passages 97 and the air inlet chamber 13.

As shown in Fig. 1, the passages 96 are intersected intermediate their ends by an angularly extending passage 99 having its outer end opening in the outer surface of the bearing support 14, and its inner end opening in the wall of bore 21 at a position substantially intermediate the ends of the central body portion 28. Overlying the outermost ends of the passages 99, is a blanket element 100 of fibrous sheet or suitable fabric to form a cover or strainer to prevent entry of foreign particles into the lubricant circulation system. This blanket extends longitudinally of the bearing support between the end flange 15 and the shoulder 20, and is held in position by any suitable means such as binding wires 101.

In operation, lubricant is conducted from the oil chamber 12 to the surface of the central body portion 28 of the shaft by means of the wicks 92a and 92b. The high velocity of the shaft causes the oil to be formed into a mist within the bore 21 surrounding the central body portion 28 of the shaft. The action of the slinger or fan elements 32 and 36 produces airflows outwardly through the bearings 24 and 26 which will carry the fine oil mist into the bearings from whence it is returned through the passages 96, and thence through the inner end of passage 99 to the bore 21 space surrounding the central body portion 28. Moreover, oil may drain from the bore space through the lowermost passages 99 by gravity and be filtered by the blanket 100 in its passage into the oil chamber 12.

Cooling of the bearing support 14 and the lubricant is accomplished by airflow through the passages 97, which is set up by the suction created by fan 38. Ambient air is drawn in through the channels 70 from the exterior of the unit. This ambient air in its passage to the port openings 74 is conducted over the inner faces of the nozzle member 83 and turbine wheel 33 in heat transfer relation therewith. Advantage is thus taken of the cooling effect which results from the expansion of air passing through the nozzles and blades of the turbine which will cool the turbine wheel 33, and consequently the ambient air flow.

The details of the labyrinth seal at the turbine end between the hub 31 and hub 54 of the seal member 17, will now be explained. Referring to Fig. 6, the bore 55 of the hub 54 is coated with a lining 102 of a composition containing lead, or other suitable composition which has a suitable plastic flow characteristic. The hub 31 has its outer surface formed with a plurality of spaced circumferentially extending grooves 103 defining spaced lands 104. As initially fabricated, the internal diameter of the lining 102 is made slightly less than the outside diameter of the lands 104. To assemble and complete the labyrinth seal, the seal member 17 is supported in axially aligned position by the screws 75 which are in starting position in the threaded sockets 76, such that as these screws are tightened, the lining 102 will pass over the grooved surface of the hub 31.

The sharp edges of the lands 104 will thus act as cutting members to give a broached fit between the lining and surface of the lands. The parts are then disassembled and cleaned to remove any particles of metal, and then again assembled. Upon subsequent operation of the unit, the composition comprising the lining 102 undergoes plastic flow so as to bulge into the grooves 103 slightly to form a labyrinth seal and take care of any slight eccentricity which might be present.

I claim:

1. A turbine driven unit, comprising: a housing; a bearing structure supported in said housing and containing fluid flow passages; a shaft rotatably mounted in said bearing structure; a turbine casing connected to and extending from one end of the housing defining an inlet chamber and an outlet flow passage; flow nozzles interconnecting said chamber and passage; a turbine wheel carried by said shaft having parts operatively associated with said nozzles; means sealing said turbine wheel at its periphery; a seal member positioned between said turbine wheel and the adjacent end of said bearing structure, said member being clamped between portions of said casing and portions of the adjacent housing and having a central opening for the passage of said shaft; a labyrinth seal in said opening between said member and shaft; flow channels in the surface of said member facing toward the turbine wheel, said channels having inlets in communication with exterior air and outlets connected with said bearing structure flow passages; and a fan carried by the shaft at the other end of the bearing structure having an inlet connection with said bearing structure passages so that the fan action draws exterior air through the flow channels into heat exchange relation with said turbine wheel and through said bearing structure flow passages for cooling.

2. A turbine driven unit, comprising: a housing; a bearing structure in said housing containing fluid flow passages; a shaft rotatably mounted in said bearing structure; a turbine casing connected to and extending from one end of the housing defining an inlet chamber and an outlet flow passage; flow nozzles interconnecting said chamber and passage; a turbine wheel carried by said shaft having parts operatively associated with said nozzles; means sealing said turbine wheel at its periphery; a seal member positioned between said turbine wheel and the adjacent end of said bearing structure, said member being clamped between portions of said casing and portions of the adjacent housing and having a central opening for the passage of said shaft; a labyrinth seal in said opening between said member and shaft; flow channels in the surface of said member facing toward the turbine wheel said channels having inlets in communication with exterior air and outlets connected with said bearing structure flow passages; and means driven by said shaft for impelling said exterior air through the flow channels into heat exchange relation with said turbine wheel and through said bearing structure flow passages for cooling.

3. A turbine driven unit, comprising: a housing; a bearing structure in said housing and containing fluid flow passages; a shaft rotatably mounted in said bearing structure; a turbine casing connected to and extending from one end of the housing defining an inlet chamber and an outlet flow passage; flow nozzles interconnecting said chamber and passage; a turbine wheel carried by said shaft having parts operatively associated with said nozzles; means sealing said turbine wheel at its periphery and adjacent its axis of rotation; means defining flow channels having inlets in communication with exterior air and outlets connected with said bearing structure flow passages; and means driven by said shaft for impelling said exterior air through the flow channels into heat exchange relation with said turbine wheel and through said bearing structure flow passages for cooling.

4. A turbine driven unit, comprising: a housing; a bearing structure in said housing and containing fluid flow passages; a shaft rotatably mounted in said bearing structure; a turbine casing connected to and extending from one end of the housing defining an inlet chamber and an outlet flow passage; flow nozzles interconnecting said chamber and passage; a turbine wheel carried by said shaft having parts operatively associated with said nozzles; means sealing said turbine wheel at its periphery; means defining flow channels having inlets in communication with exterior air and outlets connected with said bearing structure flow passages; and means driven by said shaft for impelling said exterior air through the flow channels into heat exchange relation with said turbine wheel and through said bearing structure flow passages for cooling.

5. A turbine driven unit, comprising: a housing; a bearing structure in said housing and containing fluid flow passages; a shaft rotatably mounted in said bearing structure; a turbine casing connected to and extending from one end of the housing defining an inlet chamber and an outlet flow passage communicating through a nozzle space with said chamber; a turbine wheel carried by said shaft having blades thereon; means positioned and clamped between portions of said casing and portions of the adjacent housing defining nozzle channels in said nozzle space operatively associated with the blades of said turbine wheel, and other channels connecting the exterior of said housing with said bearing structure flow passages; and suction means connected to said bearing structure flow passages for drawing exterior air into said other channels and bearing structure passages for cooling.

6. A turbine driven fan unit, comprising: a housing; a bearing structure in said housing and containing fluid flow passages; a shaft rotatably mounted in said bearing structure; a turbine wheel carried by one end of said shaft; an annular sealing member between said turbine wheel and said bearing structure, said sealing member having radially extending channels at its periphery communicating at their outer ends with the exterior of the housing; plenum spaces at the inner ends of said channels, said plenum spaces communicating through ports with said bearing structure passages; and suction means for drawing air from the exterior of the housing through said channels, ports and bearing structure passages for cooling.

7. A turbine driven fan unit, comprising: a housing; a bearing structure in said housing and containing fluid flow passages; a shaft rotatably mounted in said bearing structure; a turbine wheel carried by one end of said shaft; a sealing member between said wheel and the adjacent end of said bearing structure, said member having flow spaces for external air connecting with said bearing passages; and a fan carried by the shaft at the other end of the bearing structure having an inlet in communication with said bearing passages so that the fan action draws air through the passages and cools the bearing structure.

8. A turbine driven fan unit, comprising: a housing; a bearing structure in said housing and containing fluid flow passages; a shaft rotatably mounted in said bearing structure; a turbine wheel carried by one end of said shaft; a sealing member between said wheel and the adjacent end of said bearing structure, said member having flow spaces for external air connecting with said bearing structure passages; and means actuated by said shaft for circulating air through said spaces and bearing passages to cool the bearing structure.

References Cited in the file of this patent

UNITED STATES PATENTS

| Number | Name | Date |
| --- | --- | --- |
| 1,427,150 | Coppus | Aug. 29, 1922 |
| 2,138,404 | Haas | Nov. 29, 1938 |
| 2,159,422 | Buchi | May 23, 1939 |
| 2,175,470 | Kice | Oct. 10, 1939 |
| 2,176,816 | Huhn | Oct. 17, 1939 |
| 2,184,197 | Schutte | Dec. 19, 1939 |
| 2,296,701 | Butler | Sept. 22, 1942 |
| 2,364,189 | Buchi | Dec. 5, 1944 |
| 2,382,706 | Gente | Aug. 14, 1945 |
| 2,401,826 | Halford | June 11, 1946 |
| 2,481,980 | Constantime | Sept. 13, 1949 |
| 2,484,275 | Eastman | Oct. 11, 1949 |
| 2,486,731 | Buchi | Nov. 1, 1949 |
| 2,487,532 | Eastman | Nov. 8, 1949 |
| 2,495,601 | Rawson | Jan. 24, 1950 |
| 2,503,914 | Linn | Apr. 11, 1950 |
| 2,518,815 | Polk | Aug. 15, 1950 |

FOREIGN PATENTS

| Number | Country | Date |
| --- | --- | --- |
| 309,856 | Germany | June 7, 1917 |
| 595,348 | Great Britain | Dec. 3, 1947 |
| 897,034 | France | Mar. 15, 1944 |

OTHER REFERENCES

"Aviation Magazine," November 1945 (pp. 129 and 130).